US006228976B1

(12) United States Patent
Faulhammer et al.

(10) Patent No.: US 6,228,976 B1
(45) Date of Patent: May 8, 2001

(54) METHOD OF MANUFACTURING POLYAMIDES

(75) Inventors: Heike Faulhammer; Patrick Dang, both of Bernay; Bernard Jacques, Menneval; Michael Werth, Bernay, all of (FR)

(73) Assignee: Elf Atochem S.A., Puteaux (FR)

( * ) Notice: Subject to any disclaimer, the term of this patent is extended or adjusted under 35 U.S.C. 154(b) by 0 days.

(21) Appl. No.: 09/158,577

(22) Filed: Sep. 22, 1998

(30) Foreign Application Priority Data

Sep. 25, 1997 (FR) .................................................. 97 11955

(51) Int. Cl.$^7$ ........................ C08G 69/14; C08G 69/28; C08F 6/00
(52) U.S. Cl. ........................ 528/310; 528/312; 528/322; 528/323; 528/324; 528/329.1; 528/332; 528/480; 528/503
(58) Field of Search .................... 528/312, 310, 528/322, 323, 324, 332, 329.1, 480, 503

(56) References Cited

U.S. PATENT DOCUMENTS

| 3,657,194 | 4/1972 | Biensan et al. | 528/312 |
| 3,997,646 | 12/1976 | Schneider et al. | 264/176 |
| 5,674,973 | * 10/1997 | Pipper et al. | 528/323 |
| 5,696,227 | * 12/1997 | Mumcu | 528/318 |
| 5,777,067 | * 7/1998 | Sato et al. | 528/310 |

FOREIGN PATENT DOCUMENTS

| 2241131 | 3/1973 | (DE) . |
| 1602751 | 1/1971 | (FR) . |
| 2150413 | 4/1973 | (FR) . |
| 2338962 | 8/1977 | (FR) . |

OTHER PUBLICATIONS

French Search Report dated Jun. 22, 1998.
Jan Sebenda in J. Macromol. Sci. Chem. A6 (6), pp 1145–1199, (1972), Lactam Polymerization.
K. Ueda, et al., Polymer Journal, vol. 28, No. 12, pp. 1084–1089 (1996), "Stabilization of High Molecular Weight Nylon 6 Synthesized by Anionic Polymerization of ε–Caprolactam".
Photography to Plastics, Processing, Ullman's Encyclopedia of Industrial Chemistry, (vol. A20) pp 527–528.
Journal of Liquid Chromatography, 11 (16), pp 3305–3319 (1988)–to be provided.

* cited by examiner

*Primary Examiner*—P. Hampton-Hightower
(74) *Attorney, Agent, or Firm*—Smith, Gambrell & Russell, LLP

(57) ABSTRACT

The invention relates to a method of preparing polyamides, in which, in a first step, the anionic polymerization of at least one lactam is carried out and then, in a second step, a heat treatment is carried out on the polymer obtained, which has a distribution of the molar masses measured by SEC having a shape close to a Gaussian curve with a high-mass tail, at a high enough temperature and for a long enough time so as to obtain a unimodal distribution of the molar masses.

14 Claims, 4 Drawing Sheets

METHOD OF MANUFACTURING POLYAMIDES

FIELD OF THE INVENTION

Figure 1:
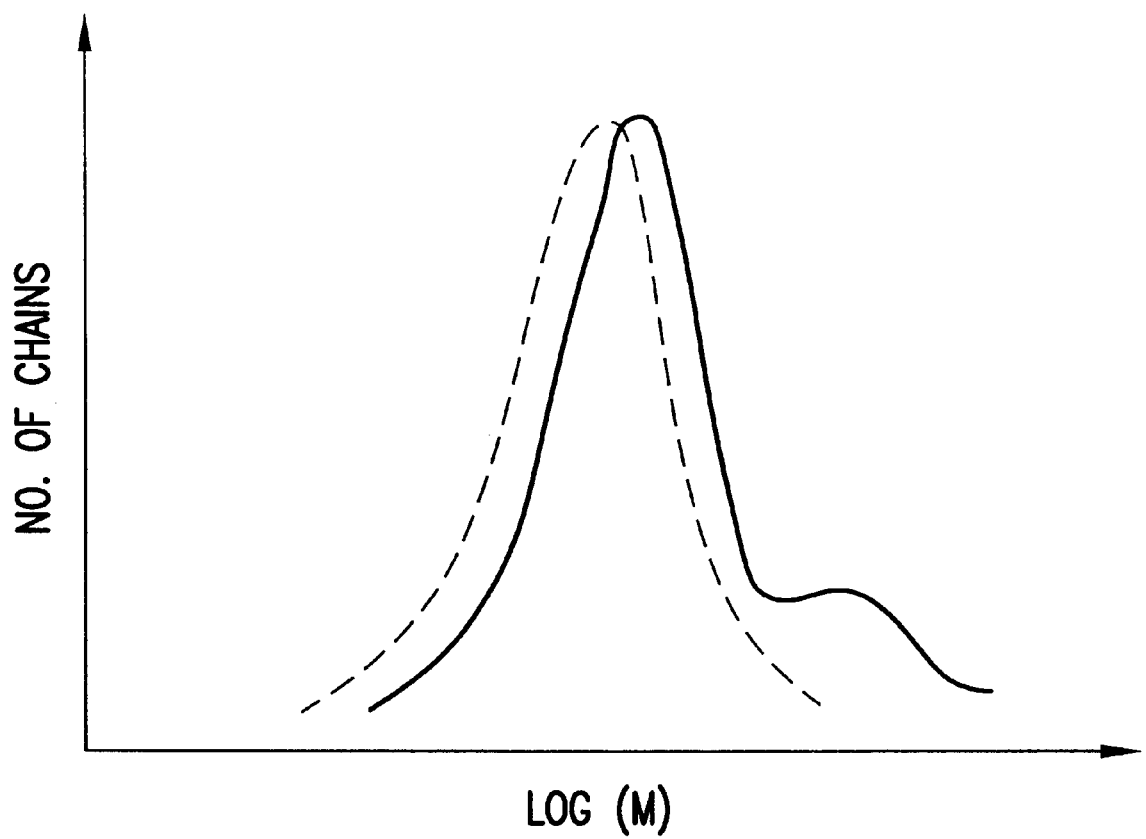

The present invention relates to a method of manufacturing polyamides and more particularly polyamides obtained by the anionic polymerization of lactams such as, for example, caprolactam (lactam 6)

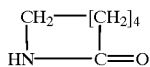

or lauryllactam (lactam 12)

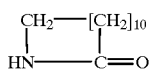

BACKGROUND OF THE INVENTION

The polymerization of lactams is described by Jan Sebenda in J. Macromol. Sci. Chem. A 6 (6), pp 1145–1199 (1972).

The anionic polymerization catalyst may be, for example, a mixture of sodium hydride and acetanilide, or a mixture of sodium and N-acetylcaprolactam.

The anionic polymerization of lactams is rapid, about 3 to 15 minutes; however, the inherent viscosity of the polyamide obtained is not stable and changes over times.

DE 2,241,131 describes the addition of diethyl melonate or of ethyl acetylacetate in the nylon-12 obtained by anionic polymerization of lactam 12 in order to avoid the large variations in the hot flow index (MFI) during its conversion into fibres, films or moulded articles.

DE 2,241,132 describes the addition of tert-butyl alcohol for the same problem. These results are not sufficient and, in addition, these additives migrate over time so that the stabilization is merely temporary.

K. Ueda, M. Nakai, M. Hosoda and K. Tai have described in Polymer Journal Vol. 28,, No. 12, pages 1084–1089 (1996) the instability of nylon-6 [or PA-6] obtained by anionic polymerization of caprolactam. They describe dissolving the PA-6 in DMSO at 150° C. under nitrogen in order to remove the residues of the anionic catalyst by treatment with an acid having a $pK_a$ of 3 to 7 in water. This method can only be used in the laboratory.

DESCRIPTION OF THE INVENTION AND BRIEF DESCRIPTION OF THE DRAWINGS

The Applicant has now discovered that the polyamides obtained by anionic polymerization of lactams had a distribution of the molar masses measured by SEC having a shape close to a Gaussian curve with a high-mass tail and that after a heat treatment the distribution of the masses measured using the same method had become unimodal and shifted towards slightly lower masses.

In the present invention, SEC denotes steric exclusion chromatography.

This heat treatment is sufficient to rearrange the distribution of the masses and obtain a polyamide of the same kind as that obtained by the hydrolytic polymerization of lactams. The hydrolytic polymerization of lactams consists in opening the lactam using water, and then in heating under pressure in order to polymerize. The duration of hydrolytic polymerization of lactam 12 may be from 4 to 12 hours, and this is why it has been attempted to produce polyamides by anionic catalysis, in particular for being able to carry out the polymerization continuously.

Ueda et al. (already mentioned) have shown that, by heating at 200° C., the nylon-6 which was not treated with acids in DMSO exhibits a drop in mass $\overline{M}_w$ (weight-average molar mass) greater than that for the polymer which has been treated. The $\overline{M}_w$ is calculated from the inherent viscosity. Although these drops follow asymptotic curves after 400 hours of heating at 200° C., it is explained that it is necessary to carry out a treatment with acids in DMSO in order to remove the catalyst residues and thus achieve stabilization. Ueda et al. did not see the distribution of molar masses and therefore saw their rearrangement to an even lesser extent. Based on this discovery by the Applicant, it is therefore possible to prepare a stable polyamide (polylactam) of mass $\overline{M}_w$ (1), i.e. a polyamide which can be converted into articles, into films, etc., without its viscosity dropping, to carry out the anionic polymerization with settings such that a mass $\overline{M}_w$ (2) greater than $\overline{M}_w$ (1) is obtained (and in fact having a shape close to a Gaussian curve with a high-mass tail) and then to carry out a heat treatment in order to reduce this mass to $\overline{M}_w$ (1), the polyamide remaining stable thereafter.

The subject of the present invention is therefore a method of preparing polyamides, in which, in a first step, the anionic polymerization of at least one lactam is carried out and then, in a second step, a heat treatment is carried out on the polymer obtained, which has a distribution of molar masses measured by SEC having a shape close to a Gaussian curve with a high-mass tail, at a high enough temperature and for a long enough time so as to obtain a unimodal distribution of the molar masses.

In the present application, the term SEC denotes the measurement of the molecular masses of polymers by steric exclusion chromatography. This technique, and more particularly its application to polyamides and to polyamide-block-polyethers, is described in "Journal of Liquid Chromatography, 11(16), 3305–3319 (1988)".

By way of example of lactams, mention may be made of those which have from 3 to 12 carbon atoms in the main ring, it being possible for these to be substituted. Mention may be made, for example, of β,β-dimethylpropiolactam, α,α-dimethylpropiolactam, amylolactam, caprolactam, capryllactam and lauryllactam. The invention is particularly useful for caprolactam and lauryllactam. The first step, i.e. the anionic polymerization, has been described in the prior art. It may be carried out in any device, for example in an extruder or in a mould. It has been discovered that the distribution of the molar masses measured by SEC had a shape close to a Gaussian curve with a high-mass tail. It may also be in the form of two successive Gaussian curves of very different sizes, one representing at least 90% by weight, and preferably 95%, of the polyamide and the other for the remainder and lying at higher molar masses. FIG. 1 shows an example of this distribution, the logarithm of the molar mass being plotted along the x axis (the values increase along the x axis) and the number of chains having the same mass being plotted along the y axis (the number of increases along the y axis).

The second step consists in heating the polyamide obtained after the first step. It is possible to carry out this second step on a polyamide which has just been obtained in the first step and which may be in the molten state or in the form of granules obtained at the head of the extruder in which the first step was carried out. The polyamide may be stored between the two steps, and treated in this second step subsequently. The end of the first step is characterized by measurement of a viscosity or of an MFI, the catalyst having been consumed and the polymerization being terminated.

The polyamide resulting from the first step is introduced as it is, i.e. without prior treatment in order to remove the catalyst, in a device enabling it to be heated. The device is adapted to the state of the polyamide, i.e. depending on whether it is available in the molten state or in the form of granules. It is possible to use any device in the art of thermoplastic polymers, such as, for example, a mixer, a single-screw extruder or a twin-screw extruder. The second step may also be carried out in the device used in the first step.

This heat treatment is carried out, for example, in the presence of water for example in the form of wet air. The polyamide may also be dried beforehand.

The temperature and duration of treatment, i.e. the time for which the polyamide is raised in temperature, depend on the amount of high molar masses and on the melting point of the polyamide. It is recommended that the temperature be from 20 to 110° C. above the melting point. It is sufficient for the polyamide to be at this temperature for from 1 to 90 minutes, preferably from 1 to 3 minutes. If the polyamide is subjected to mixing, the time is greatly reduced and may, for example, be from 20 seconds to 60 seconds. This second step may be followed by the SEC measurement and this duration is therefore easily determined.

Advantageously, it is possible to benefit from this second step in order to incorporate fillers, UV stabilizers, antioxidants, etc. into the polyamide.

After this second step, it is found from SEC that the distribution has become unimodal and that the distribution of the masses, measured by SEC, is very similar to the previous distribution which represented at least 80% by weight, and preferably 95%, of the polyamide but slightly shifted towards lower masses. By way of example, this distribution has been shown in FIG. 1 by a dotted line.

This shift in the distribution of the molar masses towards lower masses may also be expressed by a lower $\overline{M}_w$.

The Applicant, without being bound by this explanation, believes that this shift arises from a residual hydrolysis and could be minimized. The shift and the elimination of the tail on the high-mass side result in a lower $\overline{M}_w$. The elimination of the tail seems to be more important in explaining the drop in $\overline{M}_w$ than the shift.

This reduction in $\overline{M}_w$ may also be manifested by a decrease in the inherent viscosity or an increase in the MFI.

The inherent viscosity ($\eta$) is measured by Ubbelhode viscometry at 25° C. in metacresol for 0.5 g of polymer in 100 ml of metacresol. This principle is described in Ullmann's Encyclopedia of Industrial Chemistry, Vol. A 20, pp 527–528 (1995-5th edition).

By way of example in the case of nylon-12 [or polylauryllactam or poly(aminododecanoic acid)], reductions in $\eta$ of from 10 to 30% have been observed for a second step carried out under static conditions in glass tubes between 250 and 300° C. for 10 to 70 minutes.

The same reduction in $\eta$ was also obtained for a residence time in an extruder of 20 seconds at 250/270° C. and 400 bar.

EXAMPLES

First step

The anionic polymerization of lauryllactam in the presence of sodium and of N-acetylcaprolactam was carried out.

Figure 2:
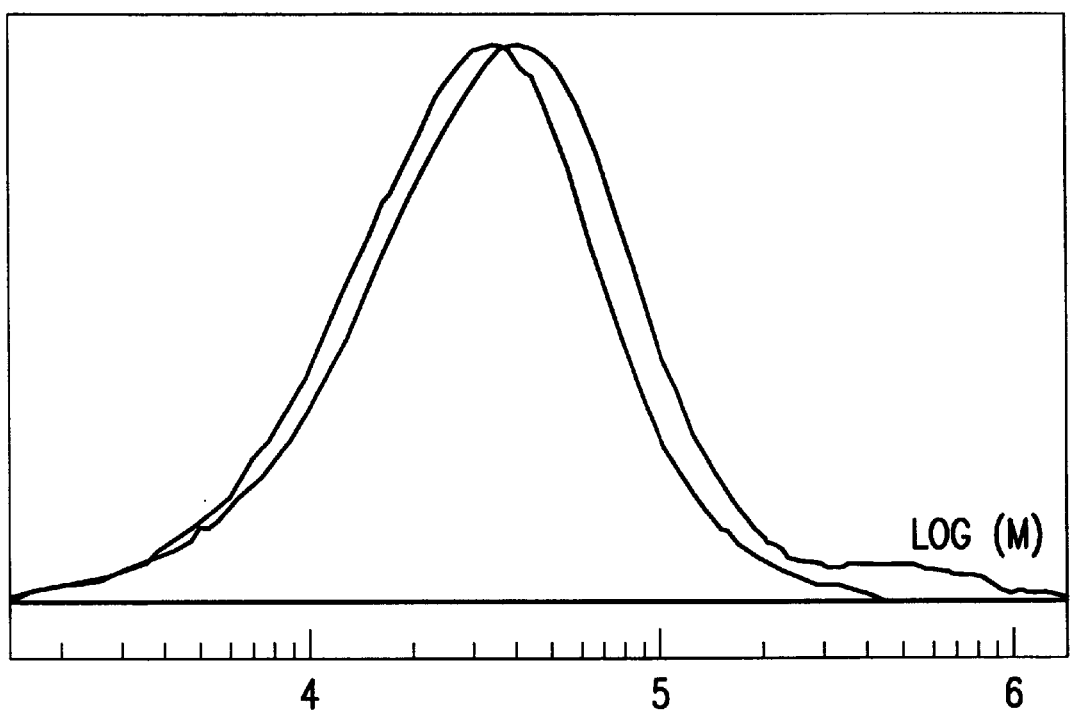

The distribution shown in FIG. 2 is obtained using the SEC measurement carried out in benzyl alcohol at 130° C., according to a method based on the publication "Journal of Liquid Chromatography, 11(16), 3305–3319 (1988)".

Analysis using SEC of the anionic nylon-12 without the prior treatment makes it possible to observe a significant shoulder on the predominant distribution of the molecular masses. This shoulder lies on the highest molecular mass side and can be interpreted as resulting from the presence of a bimodal distribution.

Second step

The distribution of molar masses after a treatment in a press for 20 seconds at 400 bar with an injection temperature of 270° C. is shown in FIG. 2 (the shifted peak).

Analysis using SEC, under the same conditions, of the anionic nylon-12 after this treatment makes it possible to observe a unimodal distribution of molecular masses. A shoulder—indicative of a bimodal distribution—is no longer visible.

It is observed that the distribution of the molecular masses after the treatment corresponds to the predominant distribution observed on the polymer before the treatment, with the possibility, however, of a slight shift towards lower masses.

It would seem that it is the disappearance of the bimodal distribution, affecting the highest molecular masses, which, more so than the slight shift of the predominant distribution, is the cause of the observed reduction in weight-average molecular mass ($\overline{M}_w$).

Figure 3:
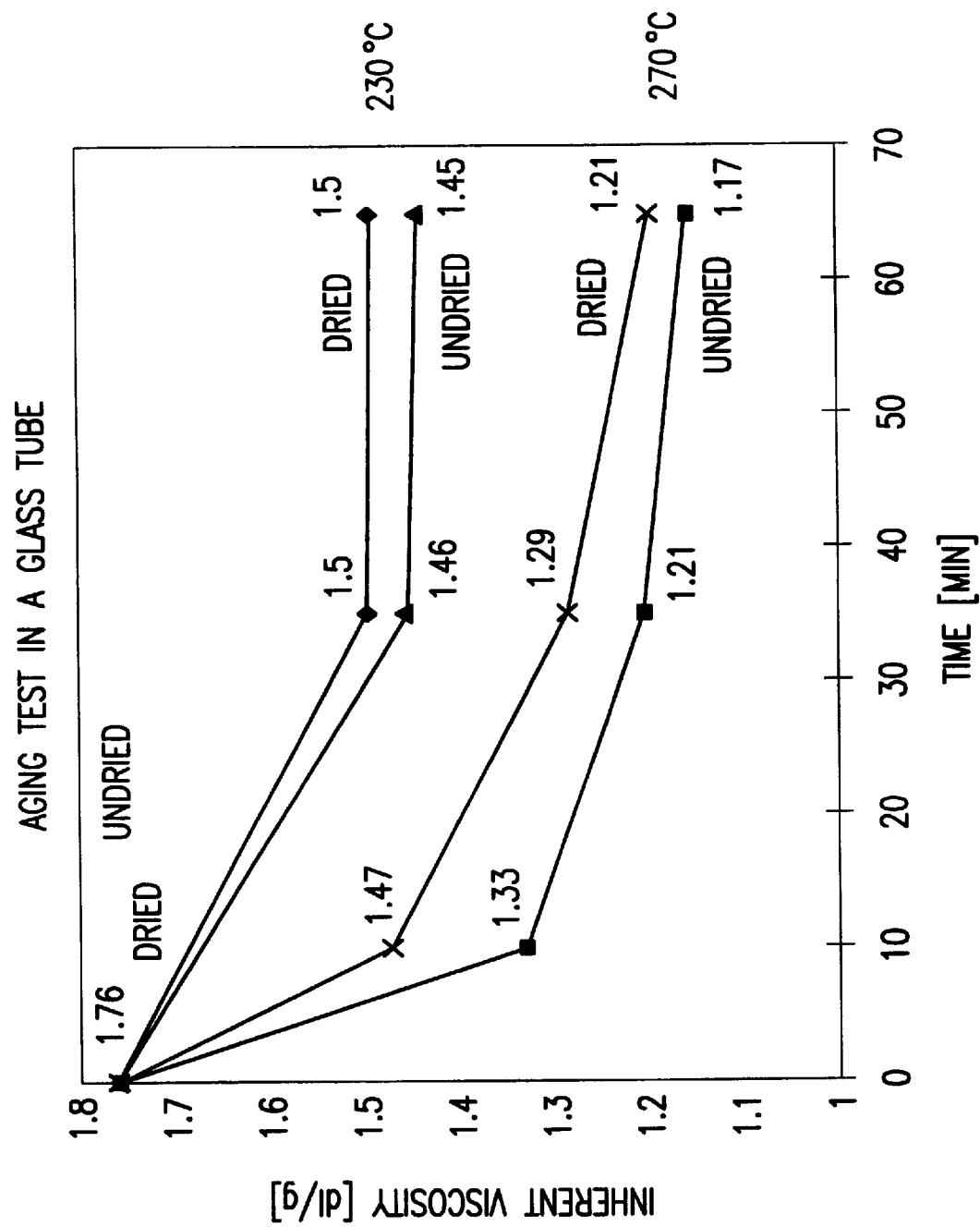
Figure 4A:
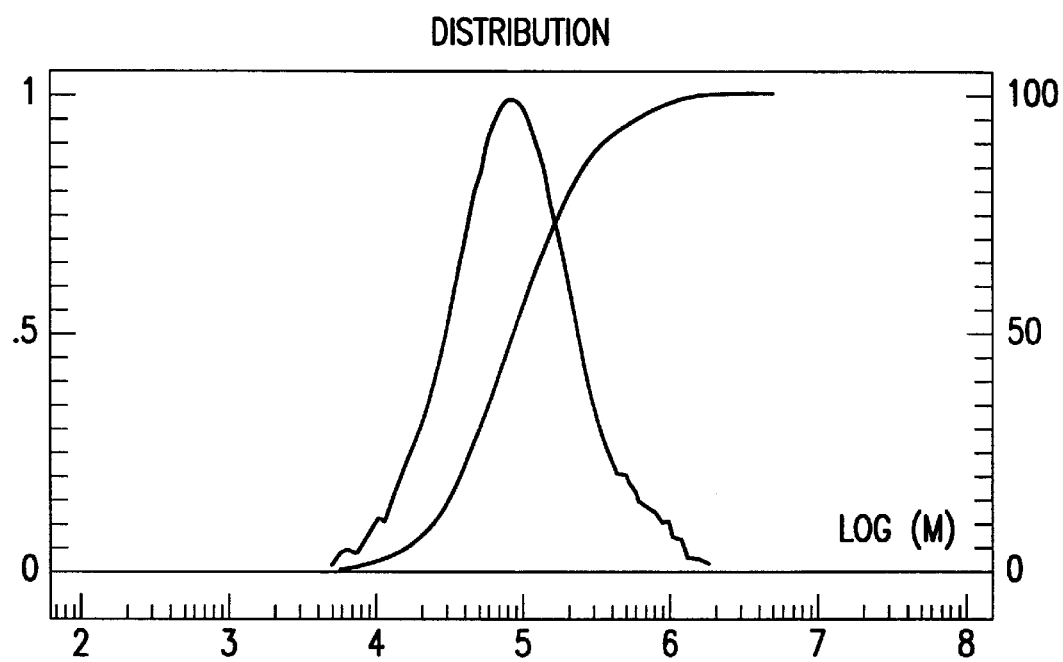
Figure 4B:
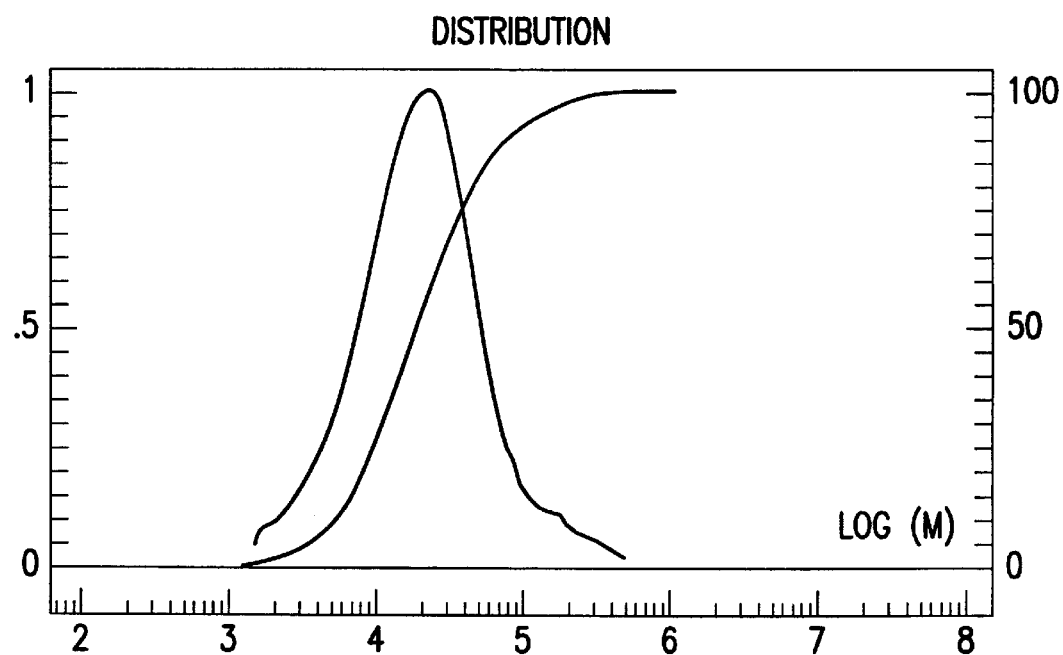

$\eta$ was also measured on granules (obtained at the end of the first step), either as produced (undried) or dried, these having been heated in glass tubes at various temperatures. These results are given in FIG. 3.

Treatment at 270° C.

"■" corresponds to as-produced granules (not dried at the end of the first step) and "x" corresponds to granules dried at the end of the first step.

Treatment at 230° C.

"▲" corresponds to as-produced granules (not dried at the end of the first step).

"♦" corresponds to granules dried at the end of the first step.

During the treatment in the press mentioned above, $\eta$ went from 1.76 to 1.26 after 20 seconds.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. A method of preparing polyamides exhibiting a unimodal distribution of molar masses, the method comprising:
   anionic polymerization of at least one lactam in the absence of a solvent, wherein the resulting polymers exhibit a distribution of molar masses which approximates a Gaussian distribution curve having a high mass tail; and
   thereafter heat treating the polymers obtained, at a temperature and duration sufficient to obtain a unimodal distribution of molar masses in the resulting polyamides.

2. The method according to claim 1, wherein the lactam is at least one member selected from the group consisting of lactams having from 3 to 12 carbon atoms in the main ring.

3. The method according to claim 2, wherein the lactam is at least one member selected from the group consisting of caprolactam and lauryllactam.

4. The method according to claim 2, wherein one or more of the carbon atoms in the main ring of the lactam is substituted.

5. The method according to claim 4, wherein the substituted lactams comprise at least one member selected from the group consisting of β,β-dimethylpropiolactam, α,α-dimethylpropiolactam, amylolactam, caprolactam, capryllactam and lauryllactam.

6. The method according to claim 1, wherein the anionic polymerization is carried out in the presence of an anionic polymerization catalyst.

7. The method according to claim 6, wherein the anionic polymerization catalyst is at least one member selected from the group consisting of a mixture of sodium hydride and acetanilide, and a mixture of sodium and N-acetylcaprolactam.

8. The method according to claim 1, wherein the unimodal distribution of molar masses in the resulting polyamide is shifted toward slightly lower masses.

9. The method according to claim 1, wherein the resulting polymers after anionic polymerization, and before heat treating of the polymers, exhibit two successive Gaussian distributions: a first distribution which comprises at least 80% by weight of the polymers, and a second distribution comprising the remainder lying at higher molar masses.

10. The method according to claim 1, wherein the heat treating of the polymers comprises raising the polyamide to a temperature of from 20 to 110° C. above its melting point.

11. The method according to claim 1, wherein the duration of the heat treating is from 20 seconds to 90 minutes.

12. The method according to claim 9, wherein the first distribution comprises at least 95% by weight of the resulting polymers.

13. The method according to claim 1, wherein the distribution of molar masses which approximates a Gaussian distribution curve having a high mass tail results from the presence of a bimodal distribution.

14. Polyamides exhibiting a unimodal distribution of molar masses prepared according to the method of claim 1.

* * * * *